Patented Nov. 5, 1946

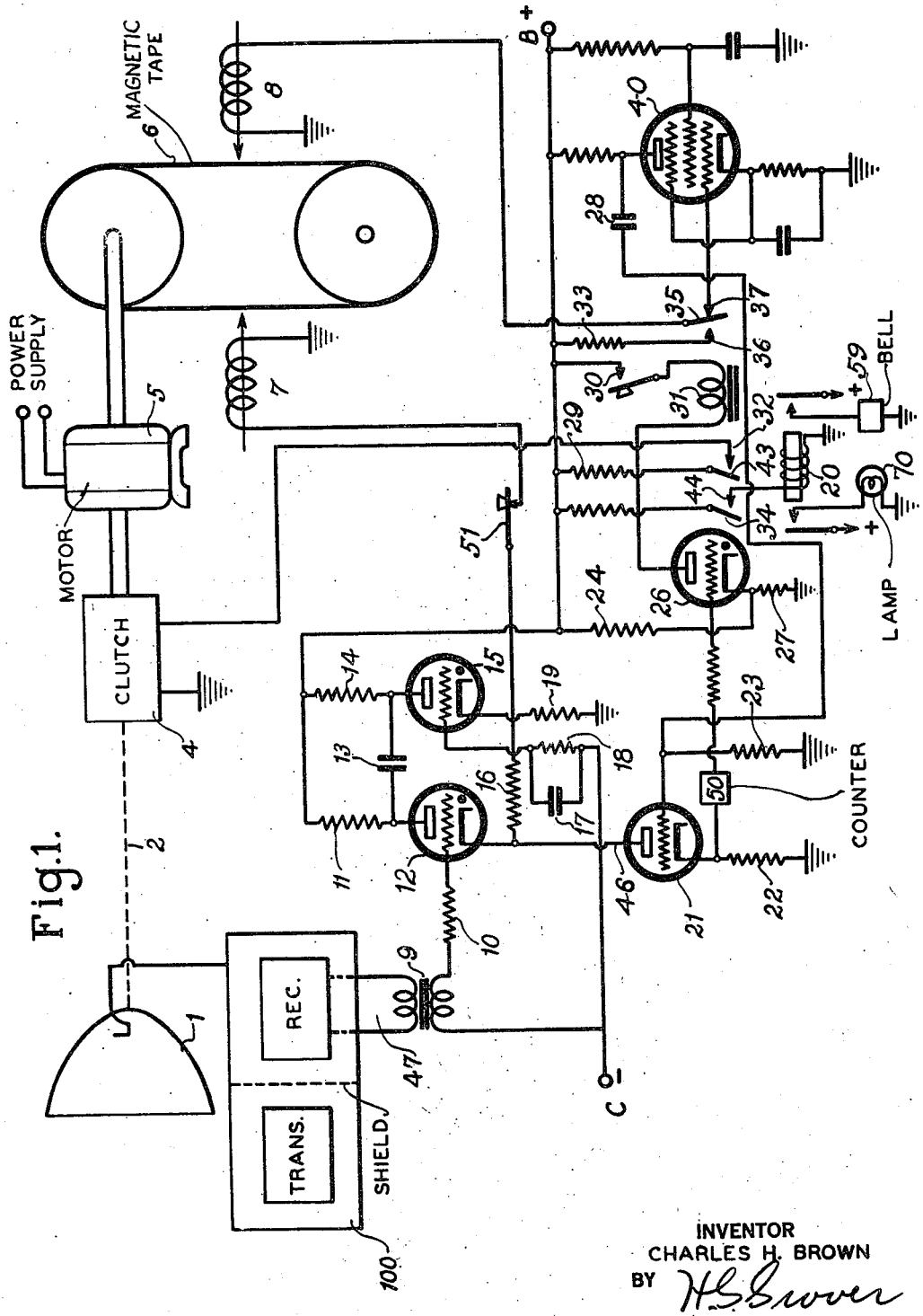

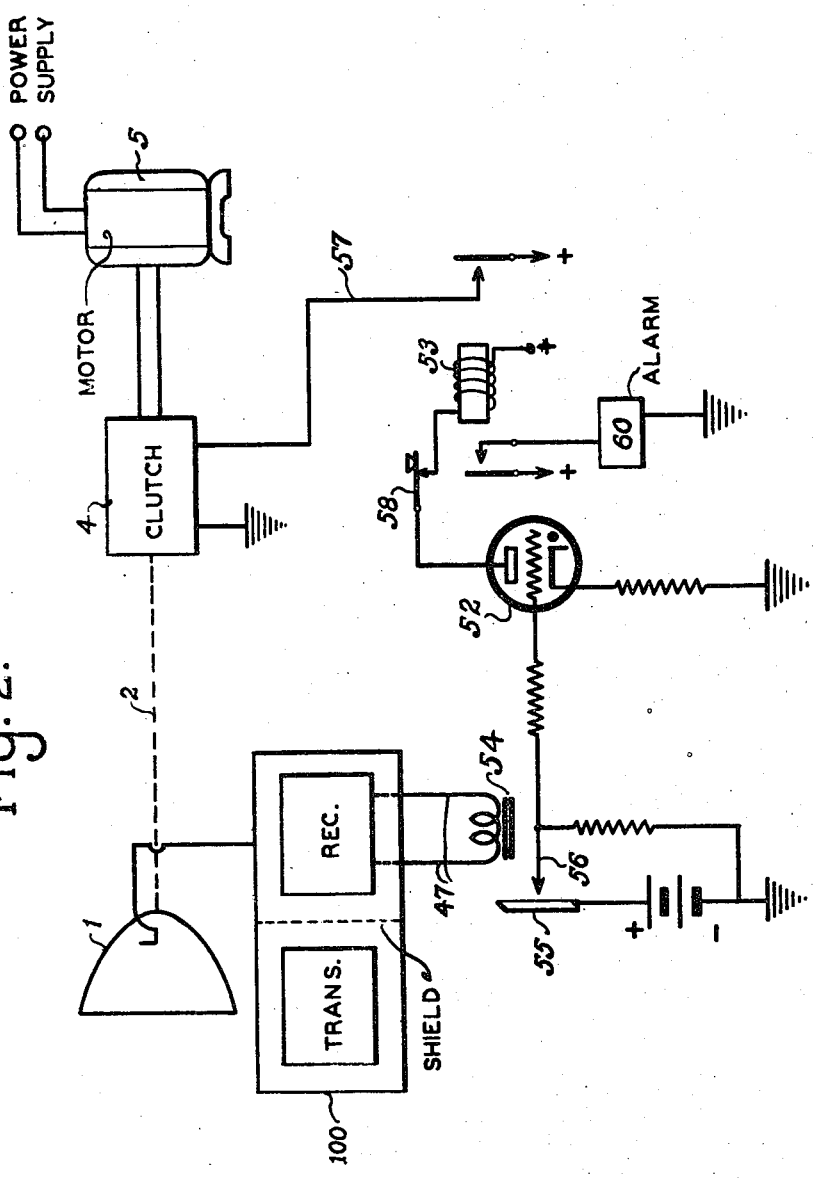

2,410,424

UNITED STATES PATENT OFFICE 2,410,424

OBSTACLE DETECTION SYSTEM

Charles H. Brown, Baldwin, N. Y., assignor to Radio Corporation of America, a corporation of Delaware Application August 18, 1942, Serial No. 455,207

25 Claims. (Cl. 250—11)

This invention relates to improvements in obstacle detection systems.

In obstacle detection systems, sometimes known as radio locators, it has been proposed to detect and observe distant and nearby objects by transmitting radio wave pulses as a result of which the objects are detected and observed by reflected pulses returning to the receiver at the same location as, or close to the transmitter. Often, the object detecting system employs directive antennas utilizing parabolic reflectors and other expedients, for both transmitter and receiver by means of which the indications are confined to objects lying within a narrow range of angles. The antennas are sometimes given a continuous motion to scan a certain field or range of solid angles somewhat after the fashion of scanning a television image, and these antennas are linked to a potentiometer which controls the voltage on the horizontal deflection plates of a cathode ray oscilloscope. Instead of wobbling the antenna system as a whole, including the reflector, it has been proposed to change the radiation pattern of the antennas, such as by locating the radiating element off-center or eccentrically, so to speak, and spinning the radiating element in a circle relative to the reflector, or by spinning a deflecting element off the focus of the reflector.

In such systems, the pulses reflected by distant objects are observed on an oscilloscope. Where known stationary objects are located in a particular field being scanned, the attendant must familiarize himself with the pattern of the waves reflected by the known objects in order that he may become instantly aware of any new indications or markings on the oscilloscope.

From experiences had in the television field, it is known that constant attention to images appearing on an oscilloscope produces eye fatigue and a loss of alertness on the part of the attendant after a period of time. Hence, it will be appreciated that in the use of radio locators it is possible for the operator to overlook the marking on an oscilloscope representative of an object to be detected, such as an enemy plane or ship.

One of the objects of the present invention is to produce an alarm in using a radio locating system, in order to attract the attention of the operator, whenever a newly found object is detected by the apparatus.

Another object of the invention is to provide a circuit arrangement for radio locators by means of which the receiving antenna continuously hunts or scans through a wide angle or pattern for the object to be detected, and when the object is detected to stop the hunting of the antenna approximately near the point at which the object is detected and to cause an alarm.

A further object is to provide a circuit arrangement for a radio locating system by means of which a pattern of signals corresponding to wave pulses reflected by known stationary objects in a field being scanned can be compared with patterns obtained during succeeding cycles of scanning, as a result of which only new signals which were not present in a preceding pattern are caused to operate an alarm.

A still further object is to enable the quick and efficient detection of a moving object amid a plurality of stationary objects in a search area.

Other objects will appear in the following description, which is accompanied by drawings wherein Figs. 1 and 2 illustrate schematically two embodiments of the present invention. Fig. 1 is primarily designed for use in fields to be scanned where there are known stationary objects, such as buildings from which pulses are reflected. Fig. 2 is for use in fields to be scanned where there are no known stationary objects or targets.

Referring to Fig. 1 in more detail, the invention is shown applied to any suitable known type of radio locating apparatus 100 equipped with a scanning directional antenna 1. The radio locating apparatus forms no part of the invention per se, except in combination with the features described hereinafter. As an illustration of one form of radio locating apparatus known in the art, such a locator may include a pulse type transmitter for radiating over directional antenna 1 extremely short pulses of ultra short waves. These pulses should be very short compared to the time intervals between them. The receiver of the locator is arranged to be inoperative to receive during the time the pulses are being transmitted, but responsive to signals or reflected pulses only when these are due to arrive. Thus, by suitably adjusting the time of response of the receiver between the times of radiation of the outgoing pulses, it is possible to determine the distance of the object being detected from the locating apparatus. Directional antenna 1 may comprise any suitable reflector, such as a parabolic or cylindrical reflector having one or more dipoles or radiating elements at or near its focus, preferably a stationary reflector and a rotatable off-center radiating element. In one form of locating apparatus, the same radiating element is used both for transmitting and receiving, there being circuits for rendering the receiver inoperative during periods of radiation.

It is preferred, for the purposes of the present invention, that antenna 1 have a wide angle of radiation, or directivity pattern, and that the directivity pattern be rotated or changed by rotating the radiating element located off the focus of the reflector in order to achieve scanning. With such a preferred arrangement, the antenna can be rotated at a speed of about sixty times a second. Movement of the antenna 1, in order to scan the field, is effected by means of shaft 2 linked at one end to the radiating element and at the other end to a magnetic clutch 4. Means are provided, not shown, whereby the attendant can disengage the antenna from the automatic driving means and thus control the movement of the antenna as a whole, by hand.

Where it is desired to rotate the entire antenna system by moving the reflector, which is not a preferred method due to the inertia of the system, the scanning or sweep of the antenna over a desired angle may follow a standard saw-tooth variation in which the forward sweep is very slow compared to the return sweep. This can be done by suitable cam mechanism connected in known manner to the antenna 1 and shaft 2. In this case, the speed of scanning may be once a second. Magnetic clutch 4 is so arranged that the motion of the antenna 1 may be suddenly stopped at any position in response to energizing current in the coil of the actuating magnet of the clutch. This clutch is driven from a motor 5 which also drives loop 6 of magnetic tape. The relative speeds of rotation or scanning cycle of the antenna 1 and the tape 6 must be such that the loop of tape 6 makes one complete circuit while the antenna 1 scans through a complete cycle of movement twice. The detected output from the receiver of apparatus 100 is fed through leads 47 and audio transformer 9 into any suitable pulse shaper. For the purpose of the invention, and by way of example only, there has been shown a pulse reshaper consisting of gaseous grid controlled triodes 12 and 15, sometimes known as "Thyratrons." This pulse reshaper 12, 15 may be referred to as a trigger circuit which requires an initiating pulse to change the condition of equilibrium for a duration depending in part upon the constants of the circuit elements and upon the electrode voltages. The term "reshaper" has been employed here because the circuit 12, 15 converts the shape of an initiating pulse applied to the grid of the tube 12 into a substantially rectangular pulse for use by the recorder coil 7 in a manner described later. Triodes 12, 15 have plate resistors 11 and 14 and cathode resistors 16 and 19. A magnetic recording coil 7 is connected in series with the cathode resistor 16 of triode 12. A switch 51 is provided in the lead between the recorder coil 7 and resistor 16. Normally, tube 12 is non-conducting and tube 15 is conducting. The firing of tube 12 will change the foregoing conditions of current conduction in these two tubes. The grid of gas triode 12 receives the incoming pulses from transformer 9 through resistor 10. The grid of triode 15 is connected to a source of negative bias C— through a large resistor 18 which is shunted by a small condenser 17. A condenser 13 is connected between the anodes of the two gas triodes and its value determines the duration of the reshaped pulse.

A magnetic pick-up coil 8 is located half way around the tape from the recording coil 7 and is connected to an armature 35 of relay 31 having oppositely disposed contacts 36 and 37 by means of which the coil 8 can be connected either to the grid of vacuum tube pentode amplifier 40 or to the B+ plate supply through resistor 33. Pentode 40 has the usual resistors and condensers for class "A" operation. Its plate is coupled via condenser 28 to the grid of vacuum tube triode 21. This triode 21 has its plate connected through connection 46 to the cathode of gas triode 12, and the cathode of tube 21 is coupled through a suitable counter circuit 50 to the control grid of gas triode or "Thyratron" 26. Resistors 23 and 22 are also used for the grid and cathode, respectively, of vacuum tube 21. Resistors 24 and 27 form a potential divider between the B+ lead and ground to maintain a high negative grid bias on gas triode 26 by elevating the cathode potential above ground. The plate circuit of this tube contains in series the actuating coil of relay 31 and a switch 30. In the absence of energizing current through the winding of relay 31, contact pairs 32—43, 36—35, and 34—44 will be normally open, while contacts 35—37 will be closed. Contact 32 is connected to the magnetizing coil of clutch 4 and serves to complete the circuit of this coil with a B+ lead through a resistor 29. The closure of contacts 34, 44 causes the operation of relay 20 which in turn closes its contacts to operate a lamp 70 and a bell 59 to attract the attention of the operator. If desired, only one of these alarm indicators may be employed.

Counter circuit 50 includes a suitable charge storing condenser and leak resistor element, whereby a positive pulse is passed on to the grid of gas tube 26 to operate this gas tube only when the charge on the condenser has reached a critical value which will be the case when a plurality of pulses flow through tube 21 from successive cycles of scanning in a definite time period. The counter serves to prevent operation of the alarm due to random noise signals.

The operation of the system of Fig. 1 will now be described in greater detail: Switch 30, whose function is described later, is normally open (as shown), and switch 51 closed. The radio receiver of the locator 1 will receive the pulses reflected from the objects to be detected as the directional antenna 1 scans or sweeps the field. Each pulse received will appear as a pulse of voltage in the output leads 47. These pulses are recorded on a loop of magnetic tape 6 which is exactly two sweep cycles in length, for example. Due to the fact that the pulses from the receiver of the apparatus 100 may vary somewhat in shape and magnitude, a reshaper or trigger circuit consisting of gas triodes 12 and 15 with associated elements is provided. Normally, tube 12 is non-conducting and tube 15 is conducting. When a pulse from the receiver appears in leads 47, it passes through transformer 9 and is applied to the grid of tube 12, thus firing or initiating conduction in tube 12, as a result of which current is set up for operating the recorder coil 7. When tube 12 starts conducting, it changes the condition of charge on the condenser 13, thus reducing the voltage on the plate of tube 12 below the arc sustaining value, as a result of which tube 15 ceases conduction momentarily. The tubes 12 and 15 regain their original status after a time interval depending upon the value of the condensers 13 and 17. In this manner a comparatively square pulse of current is obtained from the cathode of tube 12 for energizing the recorder coil 7 for each received pulse, irrespective of its character.

Thus, all pulses received on the receiver 2, irrespective of their shape and magnitude, are recorded on the tape alike.

Since the magnetic tape 6 is synchronized with the scanning sweep of the antenna 1, a panorama of the radio signals in the angle being swept is set up or registered on the tape as soon as the tape has made a few revolutions. Because each known stationary object has a given position in the field being swept, the reflected pulses from each stationary object will always appear in the same position on the panorama. As the receiver continues to hunt or scan the field, each known object will have a representative magnetic pulse on the tape and no new pulses from the known objects will be recorded, since each incoming pulse will be applied at a point where it was previously registered. At this time, switch 30 should be closed and switch 51 opened.

In order to compare the panoramic radio record on the tape 6 with the constantly incoming wave pulses, a pick-up coil 8 and a comparator device are used. Since the tape is two sweep cycles in length and recorder coil 7 and pick-up coil 8 are spaced one cycle apart, the pulses picked up by coil 8 will be at the same phase as those coming from the receiver through reshaper or trigger circuit 12, 15. Triode 21 compares these incoming pulses with those already recorded on the magnetic tape 6, since the incoming reshaped pulses from the cathode of gas triode 12 are applied to the plate of this triode 21, while the recorded pulses (as picked-up by coil 8 and amplified by pentode 40) are applied to the grid of triode 21. The pulse from the receiver applied to the plate of tube 21 must be of opposite polarity to the pulse simultaneously applied to the grid of tube 21 by the pick-up coil 8 through pentode 40. This condition can be assured by properly poling the terminal connections of the pick-up coil 8. Since the pulse applied to the plate of tube 21 is always positive, the pulse applied to the grid of tube 21 should always be negative and of a value sufficient to prevent space current flow through tube 21. When a new signal or pulse suddenly appears in the observed field, due, let us say, to a moving craft appearing in the area or field being scanned, the plate of triode 21 will receive a reshaped pulse for this new signal but since it has not been registered previously on the magnetic tape, the grid of this comparator tube 21 will receive no matching or counter-balancing negative pulse on its grid. Since the plate and grid pulses of objects already recognized are of opposite polarity and cancel each other, the application of a pulse to the plate only of tube 21 caused by the appearance of a new received pulse reflected from a newly found object, will produce a pulse of plate current which flows through the cathode resistor 22. If the newly received pulse recurs over a definite period of time, a condenser in the counter circuit 50 will become charged to a critical value and pass on a voltage pulse to ignite tube 26. If, however, the newly received pulse is caused by static, the charge on the condenser in counter 50 will leak off and no voltage will be passed to change the condition of gas tube 26. Thus, if the radiating element of antenna 1 is spinning at the rate of sixty times per second, the counter may be adjusted to require fifteen or thirty charging successive pulses before passing on a pulse to tube 26. However, if the entire antenna system is being rotated at a speed of once or twice a second, then the counter may be adjusted to require two successive charging pulses to pass on a pulse to fire gas tube 26. This pulse of current in tube 21 which occurs only for a newly received pulse (that is, a pulse reflected from an unknown object not previously identified) will be passed on, under the conditions mentioned above, as a voltage sufficient to trip or fire gas triode 26. The firing of gas triode 26 energizes the coil of relay 31 which quickly closes contacts 32—43 and 34—44. The closure of the former contacts causes magnetic clutch 4 to arrest the motion of the antenna 1, thus leaving the antenna approximately at the position at which the new object has been found. The operation of relay 31 by virtue of the closure of contacts 34—44 also causes the relay 20 to operate and produce a visual alarm by virtue of the lighting of the lamp 70 and an audible alarm by virtue of the operation of the bell 59.

The operation of relay 31 also opens contact 37—35 and closes contacts 36—35 to apply direct current to pick-up coil 8 for magnetic erasing. While the registered signals on tape 6 are being erased, the attendant can manually move directive antenna 1 to follow the newly found object which may be a plane or a ship. The relay 31 remains energized until switch 30 is opened manually at the will of the operator. The panorama of signals may then be set up again on the magnetic tape by closing switch 51, after which switch 30 can be reclosed to put the system in readiness for hunting another new object.

Fig. 2 shows the invention applied to a radio locator for scanning a field where there are no known objects or targets from which reflected pulses may be expected to be received. Such an arrangement, for example, can be used in sweeping the open sky or the wide open spaces of the ocean. The elements of Fig. 2 which are similar to those of Fig. 1 have been given the same reference numerals. Essentially, Fig. 2 differs from Fig. 1 by omitting the comparator device and the recording scheme for registering the panorama of echo signals reflected from known objects.

The system of Fig. 2 includes, in addition to the locating apparatus, the clutch 4 and the motor 5, a grid-controlled Thyratron trigger circuit 52. Coupled to the anode of tube 52, there is provided a relay 53 which operates upon the firing of the trigger circuit. The operation of relay 53 will cause the actuation of an alarm 60 which may be a lamp or a bell or both. The operation of relay 53 will also close an obvious circuit over lead 57 for actuating the energizing magnet of the clutch 4 in order to stop the movement of the antenna 1. Relay 53 will remain operated once it has been energized, until such time as an attendant opens the switch 58. The output of the receiver is connected by way of leads 47 to a relay 54 forming part of a mechanically resonant system in the form of a movable reed 55. This reed is capable of engaging contact 56 upon maximum vibration. The resonant reed system is accurately tuned to the timing of antenna rotation, so that a multiplicity of small impulses in the output of the receiver will cause relays 54 to build up the amplitude of motion of the reed to a maximum at which time the reed 55 will engage contact 56 and fire the Thyratron. The number of impulses required to cause reed 55 to engage contact 56 will depend upon the Q of the mechanically resonant system which is preferably large. The purpose of the mechanically resonant system is to prevent a single static crash or two from causing actuation of the alarm.

In the operation of Fig. 2, let us assume that the antenna 1 has a speed of rotation of sixty times per second, which is a simple matter when a spinning antenna element is employed to vary the directivity pattern. Pulses received by the radio locator will produce voltage pulses in leads 47 and relay 54, which if repeated a predetermined number of times in synchronous relation will cause the application to the grid of tube 52 of a positive potential from the reed 55 of a value sufficient to fire the trigger. The operation of the trigger circuit 52 will operate the relay 53. The operation of relay 53 will achieve two results: (1) Cause an alarm either visual or audible, or both, and (2) actuate the clutch 4 to stop movement of the antenna 1 approximately at the position at which the object to be detected has been found. The trigger circuit 52 will sustain its arc and relay 53 will remain operated until switch 58 in the anode circuit of the trigger is opened.

It should be understood that the reed and trigger circuit of Fig. 2 is merely illustrative of any suitable scheme which can be employed to achieve the results of the invention.

What is claimed is:

1. The method of detecting an obstacle by ultra short radio waves which comprises directively radiating ultra short radio wave pulses which are short compared to the time intervals between them, automatically scanning a field uniformly at a very low audio frequency rate while radiating said pulses, receiving wave pulses reflected from an obstacle in the scanning field at time intervals lying between the periods of pulse radiation, utilizing the received pulses to stop the scanning, and audibly indicating the reception of said wave pulses.

2. The method of operating a radio receiving system which includes the steps of repeatedly scanning an area for signals to be received, utilizing the signals from an object in the field being scanned to automatically stop the scanning at approximately the point at which the signals are first received, and simultaneously creating an alarm to attract the attention of the operator.

3. The method of detecting an obstacle by radio waves which comprises directively radiating radio wave pulses, repeatedly scanning a field while radiating said pulses, receiving wave pulses reflected from objects in the field being scanned at time intervals lying between the periods of pulse radiation, and utilizing only those new wave pulses received in the field being scanned which were not present during a predetermined number of previous scanning operations to automatically stop the scanning.

4. The method of detecting an obstacle by radio waves which comprises directively radiating radio wave pulses, repeatedly scanning a field while radiating said pulses, receiving wave pulses reflected from objects in the field being scanned at time intervals lying between the periods of pulse radiation, recording said received pulses, and creating an alarm upon receiving new wave pulses which were not present during a predetermined number of previous scanning operations.

5. The method of detecting an obstacle by radio waves which comprises directively radiating radio wave pulses, repeatedly scanning a field while radiating said pulses, receiving wave pulses reflected from objects in the field being scanned at time intervals lying between the periods of pulse radiation, producing temporary indications from the wave pulses reflected by known objects in the field being scanned, and utilizing new wave pulses received from newly found objects in the field being scanned for automatically stopping the scanning.

6. The method of operating an obstacle detection system which includes the steps of scanning a predetermined field at a constant and relatively slow rate, returning the system to its original point of scanning at a fast rate immediately after the scanning operation to commence re-scanning of the same field, receiving signals from objects in the field being scanned, detecting signals in the field which were not present during a predetermined number of previous scanning operations, and utilizing the detected new signals to automatically stop the scanning of the system approximately at the scanning position at which the new signals were received.

7. In an obstacle detection system utilizing the transmission of wave pulses, a receiver, a directive antenna coupled to said receiver, means for continually and repeatedly changing the directivity pattern of said antenna over an area to be scanned, means responsive to the detected output of said receiver for producing indications representing the positions of the signal wave pulses received from objects within the area being scanned, and means responsive to other wave pulses received within said area which do not register with said indications for stopping the scanning of the antenna and for creating an alarm.

8. In an obstacle detection system utilizing the transmission of radio wave pulses, a receiver, a directive antenna for said receiver, means including a motor and a magnetic clutch linked thereto for continually and repeatedly changing the directivity pattern of said antenna over an area to be scanned, said magnetic clutch controlling the mechanical coupling between said motor and said antenna, an electric tube circuit coupled to the output of said receiver, an electromagnetic relay in the output of said electric tube circuit, normally open contacts on said relay, a connection from one of said contacts to the exciting coil of said clutch, whereby the reception of pulses by said receiver causes the operation of said electric tube and said relay, as a result of which said clutch is disengaged from said antenna and the scanning of said system is stopped.

9. In an obstacle detection system, a receiver, a directive antenna therefor, means including a motor for continually and repeatedly changing the directivity pattern of said antenna over a predetermined field to be scanned, a magnetic clutch between said motor and said antenna and adapted to open the link between said motor and said receiver, means responsive to the detected output of said receiver including a trigger circuit and a magnetic tape recorder coupled to said trigger circuit for producing recordings representative of the signals received within said area, an electron discharge device circuit so arranged as to be operative solely by a received signal which does not register with the recordings on said tape, a relay coupled to said electron discharge device circuit and operative solely upon the flow of space current through said device, a pair of contacts for said relay one of which is connected to the energizing coil of said magnetic clutch and the other of which is connected to a source of potential, whereby operation of said electron discharge device circuit operates said relay and causes the energization of said clutch with a resultant fixation of the antenna.

10. In an obstacle detection system, a receiver, a directive antenna therefor, means for continually and repeatedly changing the directivity pattern of said antenna over a predetermined field to be scanned, means responsive to the detected output of said receiver for producing indications representing the positions of the signals received within said field, and means operative solely in response to new signals received within said same field which do not register with said indications for producing an indication of another kind.

11. In a radio receiving system having a directive antenna, means for continually and repeatedly changing the directivity pattern of said antenna over a predetermined area, means responsive to signals received within said area being scanned for producing indications representing the positions of said signals, and means operative solely in response to new signals received within said same area which do not register with said indications for producing an indication of another kind and for stopping movement of the directive antenna.

12. In a radio receiving system, a rotatable antenna, a motor having a drive shaft linked to said antenna for continually and repeatedly changing the antenna directivity pattern over a predetermined field to be scanned, a magnetic clutch between said shaft and said antenna, an output circuit for said receiver, a trigger circuit coupled to said output circuit for converting the shape of a voltage pulse appearing therein to substantially rectangular wave form, a magnetic tape having a recorder coil in circuit with said trigger circuit for operation from said rectangular wave form pulse, said magnetic tape having such length and driven at such speed that it travels one complete revolution for an integral number of cycles of scanning of the antenna, a pick-up coil for said magnetic tape positioned at a predetermined location on said tape, a normally inoperative alarm, and a comparator device in circuit both with said trigger circuit and said pick-up and responsive to a signal received by said receiver which does not register with previous recordings on said tape for rendering said alarm operative and for energizing said magnetic clutch to disengage said motor drive shaft from said antenna.

13. A system in accordance with claim 10, including a counter circuit for said last means, whereby only a predetermined number of new signals within a definite time limit renders said last means operative.

14. A system in accordance with claim 8, including a resonant reed for preventing random noise signals from operating said relay.

15. The method of detecting an obstacle by radio waves which comprises directively radiating radio wave pulses, scanning a field while radiating said pulses, receiving pulses reflected from an obstacle in the field being scanned, and utilizing the received reflected pulses to produce an alarm and automatically stop the scanning.

16. In a radio receiving system having a scanning device, means for controlling said device, and an alarm, the method of operating said receiving system which includes the steps of repeatedly scanning an area for signals to be received, and abstracting energy from the received signals to actuate said means to stop the scanning and to simultaneously operate an alarm to attract the attention of the operator.

17. In an obstacle detection system utilizing the transmission of radio wave pulses, a receiver, a directive antenna for said receiver, means including a motor and a magnetic clutch linked thereto for continually and repeatedly changing the directivity pattern of said antenna over an area to be scanned, said magnetic clutch controlling the mechanical coupling between said motor and said antenna, an electric tube circuit, an electromagnetic relay in the output of said receiver including a coil and a resonant vibratory element responsive to the excitation of said coil, said vibratory element in its position of maximum vibration being adapted to operate said electric tube circuit, and means responsive to the operation of said electric tube circuit for operating said clutch.

18. In a radio locator system, an indicator circuit, means for transmitting a radio wave to both stationary and moving wave reflecting objects, means for receiving the waves reflected from said objects, the waves reflected from the stationary objects recurring at said receiving means in an unchanging phase relation, and means for substantially cancelling out the received waves from said stationary objects and for supplying only the waves received from said moving objects to said indicator circuit.

19. In a radio locator system, an indicator circuit, means for transmitting a radio wave to both stationary and moving wave reflecting objects, means for receiving the waves reflected from said objects, the waves reflected from the stationary objects recurring at said receiving means in an unchanging phase relation, and means including a moving endless magnetic conductor for substantially cancelling out the received waves from said stationary objects and for supplying only the waves received from said moving objects to said indicator circuit.

20. In a system for receiving recurring pulses of energy, a signal collector, a resonant vibrating reed relay, means for changing the reception pattern of said collector at an audio frequency rate, means for impressing the energy collected by said signal collector upon said reed relay, and an indicator system coupled to a contact of said reed relay and responsive to closure of the contacts of said relay.

21. In a radio object detection system for receiving recurring pulses of radio frequency energy which are short in time duration compared to the time intervals between them, a radio signal collector, means for changing the reception pattern of said collector at a low audio frequency rate, a resonant vibrating reed relay coupled to said signal collector, said relay having contacts which are normally open in the absence of energization of said relay, and an alarm circuit coupled to a contact of said reed relay and responsive to the closure of the contacts of said relay.

22. In a radio system for receiving recurring pulses of radio frequency energy, a directive antenna, means for changing the directivity pattern of said antenna at a low audio frequency rate, a resonant relay coupled to said antenna, said relay having contacts and requiring a plurality of pulses to be applied to its winding in order to become fully operative to close said contacts, and an indicator circuit coupled to a contact of said relay and responsive to the closure of the contacts of said relay.

23. In a radio system for receiving recurring pulses of radio frequency energy, a directive signal collector, means for changing the directivity pattern of said collector at a low audio frequency rate, a resonant reed relay coupled to said signal collector, said relay having contacts and requiring a plurality of pulses to be applied to its winding in order to become fully operative, said relay being responsive to a frequency related to the frequency of the recurring pulses, and having contacts which are normally open in the absence of energization of said relay, and an indicator circuit including an electron discharge device coupled to a contact of said device, said electron discharge device being responsive to the closure of the contacts of said relay.

24. In a radio communication system, an antenna, means for changing the reception pattern of said antenna at a low audio frequency rate, a resonant relay coupled to said antenna, said relay having contacts and requiring a plurality of pulses to be applied to its winding in order to become fully operative to close said contacts, and an indicator circuit coupled to a contact of said relay and responsive to the closure of the contacts of said relay.

25. In a radio system for receiving recurring pulses of radio frequency energy, which pulses are short compared to the time intervals between them, a directive signal collector, means including a motor for continually changing the directivity pattern of said collector, a resonant relay coupled to said signal collector, said relay having contacts and requiring a plurality of pulses to be applied to its winding in order to become fully operative, said relay being responsive to a frequency related to the frequency of the recurring pulses and having contacts which are normally open in the absence of energization of said relay, and an indicator circuit including an electron discharge device coupled to a contact of said device, said electron discharge device being responsive to the closure of the contacts of said relay.

CHARLES H. BROWN.

Disclaimer 2,410,424.—*Charles H. Brown,* Baldwin, N. Y. OBSTACLE DETECTION SYSTEM. Patent dated Nov. 5, 1946. Disclaimer filed Jan. 6, 1950, by the assignee, *Radio Corporation of America.*
Hereby enters this disclaimer to claim 18 of said patent.
[*Official Gazette February 7, 1950.*]